(12) United States Patent
Lo et al.

(10) Patent No.: US 8,488,663 B2
(45) Date of Patent: Jul. 16, 2013

(54) IMPULSE NOISE MITIGATION UNDER OUT-OF-BAND INTERFERENCE CONDITIONS

(75) Inventors: Andy Lo, San Diego, CA (US); Sugbong Kang, San Diego, CA (US)

(73) Assignee: MaxLinear, Inc., Carlsbad, CA (US)

( * ) Notice: Subject to any disclaimer, the term of this patent is extended or adjusted under 35 U.S.C. 154(b) by 506 days.

(21) Appl. No.: 12/924,185

(22) Filed: Sep. 22, 2010

(65) Prior Publication Data
US 2011/0069798 A1 Mar. 24, 2011

Related U.S. Application Data

(60) Provisional application No. 61/277,315, filed on Sep. 23, 2009.

(51) Int. Cl.
*H03H 7/40* (2006.01)
*H04B 15/00* (2006.01)

(52) U.S. Cl.
USPC ............ 375/229; 375/230; 375/232; 375/285

(58) Field of Classification Search
USPC ........................ 375/229–236, 240.02–240.07, 240.26–240.29, 284, 285, 259, 295, 316, 375/354, 219, 211, 220, 221, 222, 254, 296, 375/299, 346–350; 708/322–400
See application file for complete search history.

(56) References Cited

U.S. PATENT DOCUMENTS

| | | | |
|---|---|---|---|
| 4,703,447 A | 10/1987 | Lake, Jr. | |
| 5,065,410 A * | 11/1991 | Yoshida et al. | ............... 375/345 |
| 5,226,057 A | 7/1993 | Boren | |
| 5,410,264 A | 4/1995 | Lechleider | |
| 5,818,929 A * | 10/1998 | Yaguchi | ........................ 379/418 |
| 6,005,485 A * | 12/1999 | Kursawe et al. | ............... 340/665 |
| 6,385,261 B1 | 5/2002 | Tsuji et al. | |
| 6,647,070 B1 | 11/2003 | Shalvi et al. | |
| 6,795,559 B1 | 9/2004 | Taura et al. | |
| 6,920,194 B2 | 7/2005 | Stopler et al. | |
| 6,944,301 B1 * | 9/2005 | Nohrden et al. | ................. 381/13 |
| 7,016,739 B2 | 3/2006 | Bange et al. | |
| 7,035,361 B2 | 4/2006 | Kim et al. | |
| 7,139,338 B2 | 11/2006 | Wilson et al. | |
| 7,302,024 B2 | 11/2007 | Arambepola | |

(Continued)

OTHER PUBLICATIONS

International Search PCT/US 10/02598 Mail date—Nov. 15, 2010, Maxlinear, Inc.

(Continued)

*Primary Examiner* — Sam K Ahn
*Assistant Examiner* — Linda Wong
(74) *Attorney, Agent, or Firm* — McAndrews, Held & Malloy, Ltd.

(57) ABSTRACT

A noise abatement method and system for impulse noise in an RF receiver where the RF analog signal is converted to a digital signal prior to being connected to a demodulator. Two filters are used to detect impulse noise signals even under out-of-band interferer conditions, and prevent the impulse noise from reaching the input to the demodulator. A first of the two filters detects impulse noise using signals lower than the frequency bandwidth of the desired signal, and a second of the two filters detects impulse noise using signals higher the frequency bandwidth of the desired signal. A mean magnitude of the signal is detected over a predetermined time T and is used to select which filter to use for noise abatement.

11 Claims, 3 Drawing Sheets

U.S. PATENT DOCUMENTS

| | | |
|---|---|---|
| 7,302,240 B2 | 11/2007 | Koga et al. |
| 7,463,084 B2 * | 12/2008 | Hao et al. .................. 327/553 |
| 7,499,497 B2 | 3/2009 | Huang et al. |
| 7,538,822 B2 * | 5/2009 | Lee et al. ................... 348/606 |
| 7,558,337 B2 | 7/2009 | Ma et al. |
| 7,573,966 B2 | 8/2009 | Kim et al. |
| 7,587,010 B2 | 9/2009 | Morie et al. |
| 7,630,448 B2 | 12/2009 | Zhidkov |
| 7,676,046 B1 | 3/2010 | Nelson et al. |
| 7,769,304 B2 * | 8/2010 | Sakamoto et al. ........... 398/202 |
| 8,194,808 B2 * | 6/2012 | Gaikwad .................... 375/347 |
| 2004/0213366 A1 * | 10/2004 | Ono ........................... 375/348 |
| 2006/0023823 A1 * | 2/2006 | Sun et al. .................... 375/362 |
| 2007/0291178 A1 * | 12/2007 | Chao et al. .................. 348/607 |
| 2008/0181294 A1 * | 7/2008 | Andrle et al. ............... 375/239 |
| 2008/0226001 A1 | 9/2008 | Geng et al. |
| 2009/0005997 A1 * | 1/2009 | Willen ......................... 702/13 |
| 2009/0082691 A1 * | 3/2009 | Denison et al. ............. 600/544 |
| 2009/0168929 A1 | 7/2009 | Liu et al. |
| 2009/0216353 A1 * | 8/2009 | Van Reck .................... 700/94 |
| 2009/0323903 A1 | 12/2009 | Cioffi et al. |
| 2010/0054150 A1 | 3/2010 | Oksman et al. |

OTHER PUBLICATIONS

Patent Cooperation Treaty, International Bureau, Notification Concerning Transmittal of International Preliminary Report on Patentability, in International application No. PCT/US2010/002598, dated Apr. 5, 2012.

* cited by examiner

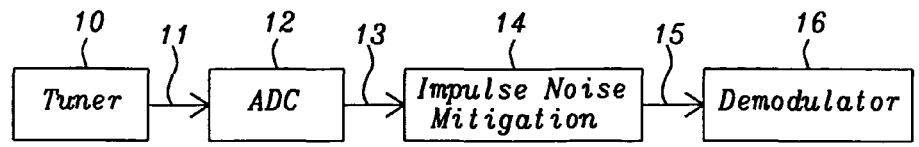
FIG. 1 — Prior Art
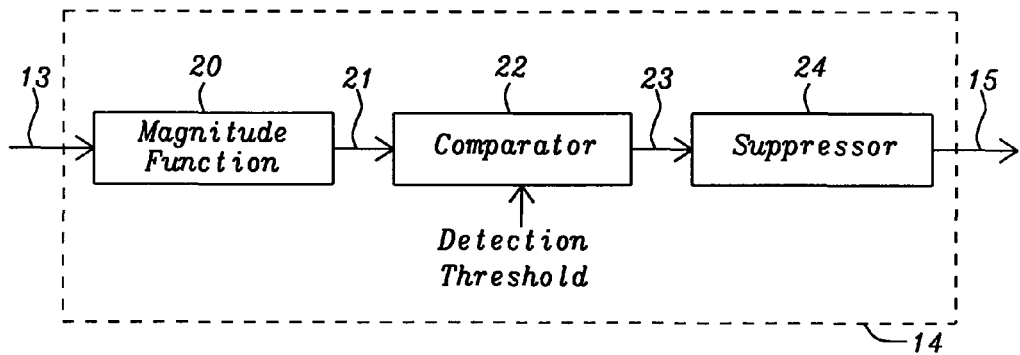
FIG. 2 — Prior Art
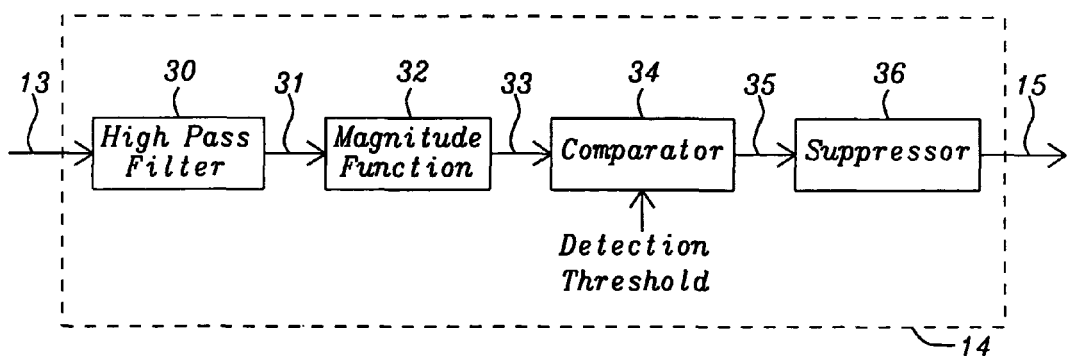
FIG. 3 — Prior Art

IMPULSE NOISE MITIGATION UNDER OUT-OF-BAND INTERFERENCE CONDITIONS

This application claims priority to Provisional Patent Application Ser. No. 61/277,315, filed on Sep. 23, 2009, which is herein incorporated by reference in its entirety.

BACKGROUND OF THE INVENTION

1. Field of Invention The present invention is related to a wireless communication receiver and in particular impulse noise mitigation.

2. Description of Related Art

Noise and in particular impulse noise, which is generated in short bursts, can be disruptive to data (broadcasts) that are processed through an analog receiver and translated into a digital format to produce a quality output as one might experience in a received radio transmission. The impulse noise can be caused by many modern day sources in which ignition systems and domestic appliances represent a couple of sources. Elimination or mitigation of impulse noise is essential to a clear reproduction of the received analog signal into a digital signal format.

US Patent Application Publication 2010/0054150 (Oksman et al.) is directed to a method and system in which impulse noise is monitored and noise protection parameters are adjusted. In US Patent Application Publication 2009/0323903 (Cioffi et al.) a method and apparatus is directed to monitoring and adjusting noise abatement in a DSL link. In US Patent Application Publication 2009/0168929 (Liu et al.) a method and apparatus is directed to an adaptive impulse noise detection and suppression. In US Patent Application Publication 2003/0099287 (Arambepola) a method and apparatus is directed to detecting impulse noise in COFDM modulated TV signals. U.S. Pat. No. 7,676,046 B1 (Nelson et al.) is directed to a method of removing noise and interference from a signal by calculating a time-frequency domain of the signal and modifying each instantaneous frequency. U.S. Pat. No. 7,630,448 B2 (Zhidkov) is directed to a method to reduce noise in a multiple carrier modulated signal by estimating impulse noise and removing the noise as a function of the estimated impulse noise. U.S. Pat. No. 7,573,966 B2 (Kim et al.) is directed to a signal conditioning filter and a signal integrity unit to address equalization and noise filtering to improve signal fidelity. In U.S. Pat. No. 7,558,337 B2 (Ma et al.) a method and apparatus is directed to signal processing to mitigate impulse noise. In U.S. Pat. No. 7,499,497 B2 (Huang et al.) a method and apparatus is directed to suppression of impulse noise in an OFDM system. U.S. Pat. No. 7,302,240 B2 (Koga et al.) is directed to a communication apparatus that has an ADC to convert an analog signal to a digital signal before applying an noise detector.

U.S. Pat. No. 7,139,338 B2 (Wilson et al.) is directed to a receiver with a filter and an impulse response from which a controller adapts the impulse response to the filter. U.S. Pat. No. 7,035,361 B2 (Kim et al.) is directed to a signal conditioning filter and a signal integrity unit to address coupled problems of equalization and noise filtering. In U.S. Pat. No. 7,016,739 B2 (Bange et al.) a system and method is directed to removing narrowband from an input signal in which notch frequencies of notch filters are adjusted in accordance with a detected noise spectrum. In U.S. Pat. No. 6,920,194 B2 (Stopler et al.) a method and system is directed to correcting impulse noise present on an input signal. U.S. Pat. No. 6,795,559 B1 (Taura et al.) is directed to an impulse noise reducer, which detects and smoothes impulse noise on an audio signal. U.S. Pat. No. 6,647,070 B1 (Shalvi et al.) is directed to a method and apparatus for combating impulse noise in digital communication channels. U.S. Pat. No. 6,385,261 B1 (Tsuji et al.) is directed to an impulse noise detector an noise reduction system in an audio signal. U.S. Pat. No. 5,410,264 (Lechleider) is directed to an impulse noise canceller, which recognizes, locates and cancels impulse noise on an incoming signal. U.S. Pat. No. 5,226,057 (Boren) is directed to adaptive digital notch filters for use with RF receivers to reduce interference. U.S. Pat. No. 4,703,447 (Lake, Jr.) is directed to a mixer controlled variable passband finite impulse response filter. U.S. Pat. No. 4,703,447 (Lake, Jr.) is directed to a mixer controlled variable passband finite impulse response filter.

A primary purpose of a receiving tuner is to select a particular channel of interest and convert that frequency band to a baseband for digital signal processing. Shown in FIG. 1 of prior art an output 11 of a tuner 10 is processed through an analog to digital converter (ADC) 12 to translate the analog output 11 of the tuner into a digital time domain waveform. Mitigation of sudden spikes in the time domain waveform, which are caused by impulse noise, prevent an accurate demodulation 16 of the digital signal produced by the ADC 12. The output 13 of the ADC12 is applied to an impulse noise mitigation circuit 14 and the output 15 of the impulse noise mitigation circuit is connected to a demodulator 16.

Shown in FIG. 2 of prior art is an expansion of the impulse noise mitigation 14 for time domain noise mitigation for impulse noise interference detection. An output of a magnitude function 20 is compared to a threshold using a standard comparator 22. the output 23 of the comparator 22 is used as an impulse noise flag by the suppressor circuit 24. The output of the suppressor circuit 15 is connected to the demodulator 16. The detection threshold of the comparator 22 can either be a fixed predetermined value or the detection threshold can be dynamically calculated based on the output 21 of the magnitude function. The suppressor circuit 24 either clips the samples of the digital signal that are found to be impulse noise in the comparator or nulls out the corrupted samples of the digital signal caused by impulse noise.

A shortcoming of the time domain method of impulse noise mitigation, shown in FIG. 2, is the inability to detect the presence of impulse noise under normal or relatively high carrier to interference ratio. The impulse noise can often be buried under the average envelop of the desired signal.

FIG. 3 is an impulse noise mitigation scheme of prior art in the frequency domain. The output of the ADC 13, shown in FIG. 1, is connected to a high pass filter 30 and the output 31 of the high pass filter is connected to a magnitude function 32. The output of the magnitude function 33 is applied to a comparator circuit 34 having a detection threshold control. The output 35 of the comparator is connected to a suppressor circuit 36, which connects 15 back to the demodulator shown in FIG. 1

In the scheme shown in FIG. 3 the detection threshold can be fixed to a predetermined value or dynamically adjusted based on the output 33 of the magnitude function 32. The suppressor circuit 36 either clips the signal samples that are determined to be impulse noise or nulls out the corrupted samples.

The main drawback of the frequency domain method shown in FIG. 3 is the inability to detect the presence of impulse noise under out of band interferers, especially adjacent interferers, where the signal at the output of the magnitude function 33 will contain the energy of both the impulse noise and the interferers thus making the detection of impulse noise unreliable.

SUMMARY OF THE INVENTION

It is an objective of the present invention to provide two complex filters to improve the frequency domain impulse mitigation.

It is still an objective of the present invention wherein a first filter admits only frequency components higher than the desired signal bandwidth in the positive frequency domain and the second filter admits frequency components lower than the desired signal bandwidth in the negative frequency domain.

It is further an objective of the present invention to measure the mean magnitude over a time interval T of each of the two high pass filters in order to select which of the two filters to use to detect and mitigate impulse noise.

In the present invention two complex high pass filters are used to mitigate impulse noise and other noise interferer signals. The response of each individual filter is measured over a time period T to determine which filter provides the best response. This measurement is the mean magnitude of the noise signal that is being removed from the signal being connected to the output of an impulse noise mitigation circuit, whereupon the filter producing the lowest mean magnitude value is chosen for impulse noise mitigation. This selection also dramatically reduces energy of other noise interferer signals. It should be noted that one of the two filters admits frequency components higher than the desired bandwidth on the positive frequency axis and the other of the two filters only admits frequency components lower than the desired signal bandwidth.

BRIEF DESCRIPTION OF THE DRAWINGS

This invention will be described with reference to the accompanying drawings, wherein:

FIG. 1 is a block diagram of a typical communication receiver of prior art;

FIG. 2 is a block diagram of time domain impulse noise mitigation of prior art;

FIG. 3 is a block diagram of frequency domain impulse noise mitigation of prior art;

DETAILED DESCRIPTION OF THE PREFERRED EMBODIMENT

Figure 4:
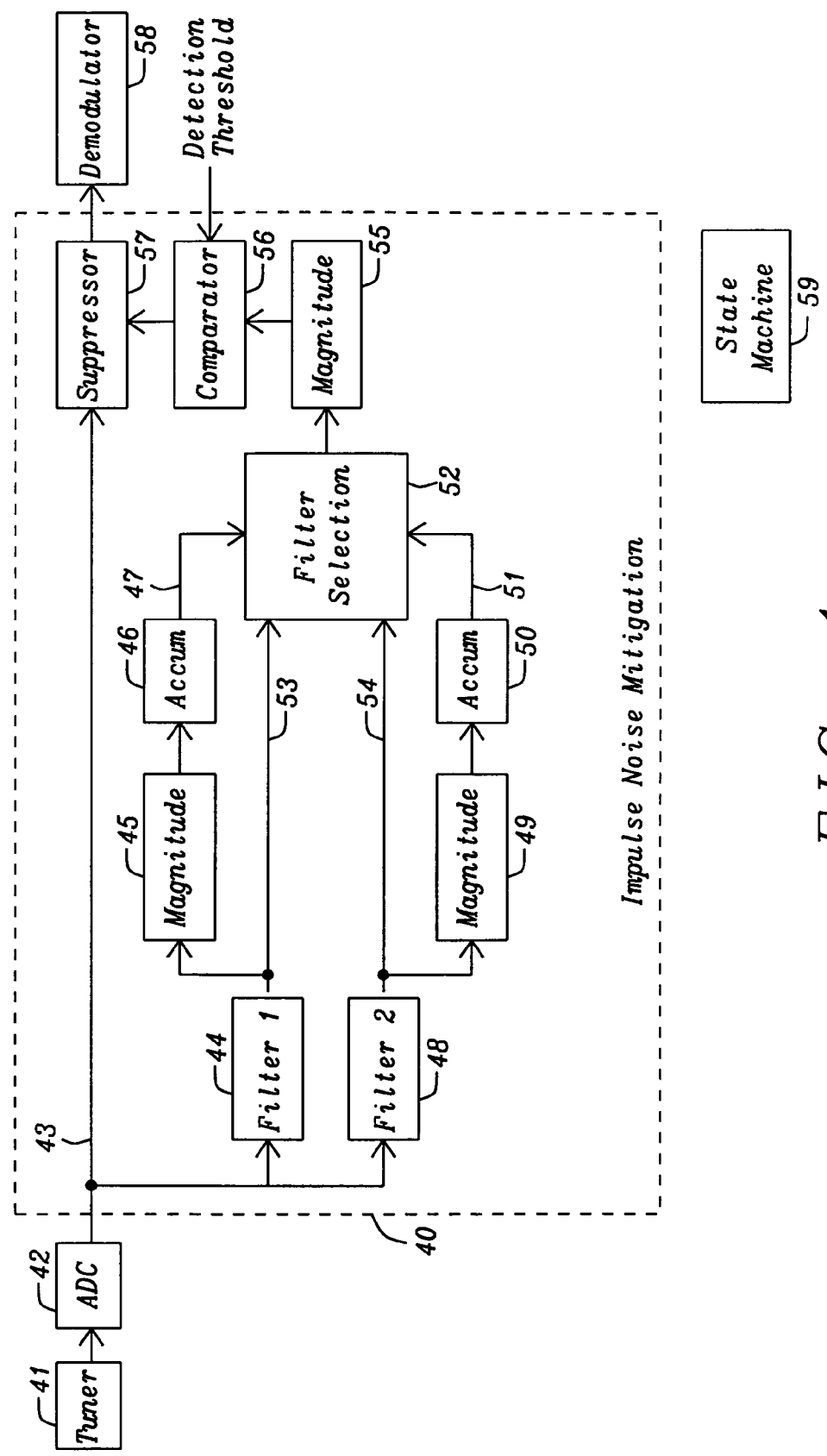
FIG. 4 is a block diagram of the present invention of frequency domain impulse noise mitigation.

In FIG. 4 is shown a block diagram of the frequency domain impulse noise mitigation 40 of the present invention. The output of an analog tuner 41 is connected to an ADC 42 to convert the receiver analog signal into a digital signal. The output 43 of the ADC 42 is coupled to the impulse noise mitigation circuit 40 for the purpose of impulse noise detection. The output of the ADC 43 is also connected to the suppressor circuit 57. When impulse noise is detected from signal samples applied to the filters 44 and 48, these samples will be flagged with an impulse noise indicator, and then the mitigation is applied to the corresponding ADC output connected directly to the suppressor circuit 57.

Within the impulse noise mitigation circuitry 40 are two complex high pass filters 44 and 48, filter 1 and filter 2 respectively. Each of filter output is connected to a magnitude function 45 and 49, respectively, in which outputs of the magnitude functions are connected to accumulator circuits 46 and 50, respectively. After accumulation over T samples, filter selection 52 selects one of Filter1 44 and Filter2 48 by comparing accumulator outputs 47 and 51. The unselected filter can be disabled hereafter to reduce power consumption. The selected filter output is connected to a magnitude, or gain, function 55 that is connected to a comparator 56. A detection threshold is either a fixed to a predetermined value, or dynamically adjusted based on the output of the magnitude function 55. The suppressor circuit 57 connects the noise mitigated signal to the demodulator 58 and either clips the signal samples that are determined to be impulse noise, or nulls out the corrupted samples. A state machine 59 controls the operation of the impulse noise mitigation circuitry 40, including which filter to activate, evaluation of the mean magnitude over T samples for each filter and the filter chosen to mitigate the impulse noise and any interferers.

It should be noted that it is within the scope of the present invention that a single programmable filter can be used, wherein both filters are integrated together and are separately selectable. The programmable filter is first configured similar to filter1 44 and the mean magnitude u1 is measured over T samples. Then the programmable filter is configured similar to filter2 48 and the mean magnitude u2 is measured over T samples. The two mean magnitudes u1 and u2 are compared, and the programmable filter is configured according to the method shown in FIG. 6.

It should also be noted that by using only one filter and disabling the other filter, power consumption can be improved. The purpose of using two filters is to detect impulse noise under out-of-band interference conditions, which is a drawback of the prior art shown in FIG. 3. Thus the present invention improves impulse noise detection by selecting a filter without out-of-band interference.

Figure 5:
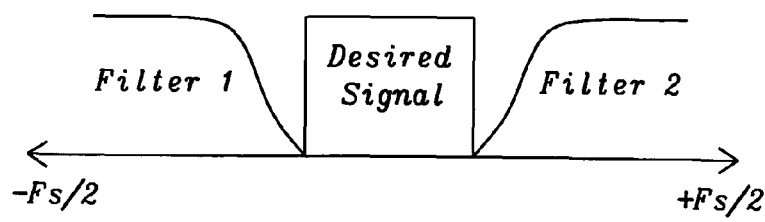
FIG. 5 is a frequency domain diagram showing the effects of the impulse noise mitigation relative to the desired signal.

FIG. 5 demonstrates the effects of the two complex high pass filters of the impulse noise mitigation method of the present invention in the frequency domain. Filter1 only allows frequency components higher than the cut-off frequency of filter1 to pass through the impulse noise mitigation circuit 40 and filter2 only allows frequency components lower than the cut-off frequency of filter2 to pass through the impulse noise mitigation circuit. By collecting the mean signal data over a time duration (or samples) T for each filter the state machine 59 selects which filter to use to detect impulse noise under significant out-of-band interference condition.

Figure 6:
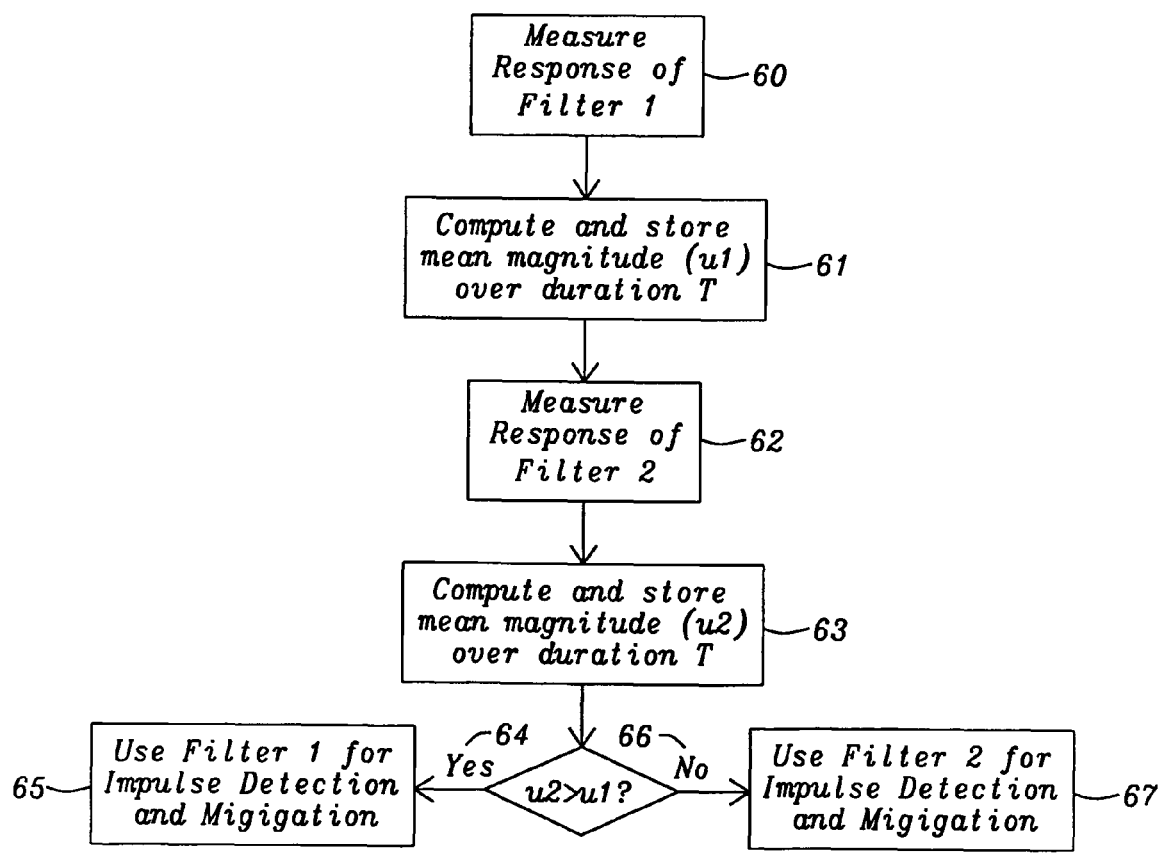
FIG. 6 is a method for impulse noise mitigation of the present invention.

FIG. 6 demonstrates the method for impulse noise mitigation of the present invention. Under control of the state machine 59 the response of the first filter to impulse noise and other interferer frequencies is measured 60. The mean magnitude (u1) of the effects on the incoming signal is computed and stored for the first filter 61 over a time duration (or sample) of "T". Then the response of the second filter to impulse noise and other interferers is measured 62, and the mean magnitude (u2) of the effects on the incoming signal is computed and store for the second filter 63 over a time (or sample) duration of "T". If the computed mean value "u2" is greater than the computed mean value "u1" 64, then the first filter is selected and used for impulse noise detection and mitigation 65. Otherwise if "u1" is greater than or equal to "u2" 66, the second filter is selected and used for impulse noise detection and mitigation 65. The unselected filter can be disabled hereafter to reduce power consumption.

While the invention has been particularly shown and described with reference to preferred embodiments thereof, it will be understood by those skilled in the art that various changes in form and details may be made without departing from the spirit and scope of the invention

What is claimed is:

1. A method for impulse noise mitigation, comprising:
   a) forming an impulse noise mitigation circuit;
   b) forming two complex high pass filters within the impulse noise mitigation circuit;
   c) setting a cut-off frequencies of the two complex high pass filters to bound a frequency bandwidth of a desired signal, wherein a first of the two complex high pass filters allows frequencies higher than the frequency bandwidth of the desired signal, and wherein a second of the two complex filters allows frequencies lower than the frequency bandwidth of the desired signal;
   d) measuring a first signal response of the first filter;
   e) measuring a second signal response of the second filter;
   f) computing and storing a mean magnitude separately for the first signal response of the first filter and the second signal response of the second filter;
   g) selecting the first filter for impulse noise mitigation if the mean magnitude of the second filter is greater than the mean magnitude of the first filter; and
   h) selecting the second filter for impulse noise mitigation if the mean magnitude of the first filter is greater than the second filter.

2. The method of claim 1, wherein measuring the first and second signal response occurs over a predetermined time period.

3. The method of claim 1, wherein computing and storing the mean magnitude and selecting either the first or second filter is controlled by a state machine.

4. The method of claim 1, wherein impulse noise mitigation includes other noise interferers.

5. The method of claim 1, wherein the first and the second filter are integrated together into a single programmable filter, wherein the single programmable filter is initially configured as the first filter to measure the mean magnitude of the first filter and then configured as the second filter to measure the mean magnitude of the second filter, whereupon the mean magnitudes of the first filter and the second filter are compared to select which filter configuration to use to mitigate impulse noise.

6. A system for impulse noise mitigation, comprising:
   a) an impulse noise mitigation circuit (INMC) connected to an output of an analog to digital converter (ADC) configured to convert an analog RF signal to a digital signal;
   b) the INMC further comprises two complex high pass filters, which bound a bandwidth of a desired RF signal;
   c) the INMC is configured to measure a response, to impulse noise, of each of the two complex high pass filters over a predetermined time span, and compute, for each of the two complex high pass filters, a mean magnitude value of the effects of the impulse noise on the output of the ADC;
   d) a first filter of the two complex high pass filters is selected to abate impulse noise and other interferer when the mean magnitude value of the second filter of the two complex high pass filters is greater than the mean magnitude value of the first filter of the two complex high pass filters; and
   e) the second filter of the two complex high pass filters selected to abate impulse noise and other interferer when the mean magnitude value of the first filter of the two complex high pass filters is greater than the mean magnitude value of the second filter of the two complex high pass filters.

7. The system of claim 6, wherein the first filter operates on frequency components of the RF signal higher than a desired signal frequency band to detect impulse noise.

8. The system of claim 6, wherein the second filter operates on frequency components of the RF signal lower than a desired signal frequency band to detect impulse noise.

9. The system of claim 6, wherein the ADC receives an input from an RF tuner.

10. The system of claim 6, wherein the INMC delivers a digital signal with impulse noise mitigated from the desired signal to a demodulator circuit.

11. The system of claim 6, wherein the two complex high pass filters are integrated together into a single programmable complex high pass filter, wherein the single programmable complex high pass filter is initially configured as the first filter to measure the mean magnitude of the first filter and then configured as the second filter to measure the mean magnitude of the second filter, whereupon the mean magnitudes of the first filter and second filter are compared to select which filter configuration to use to mitigate impulse noise.

* * * * *